Figure 1:
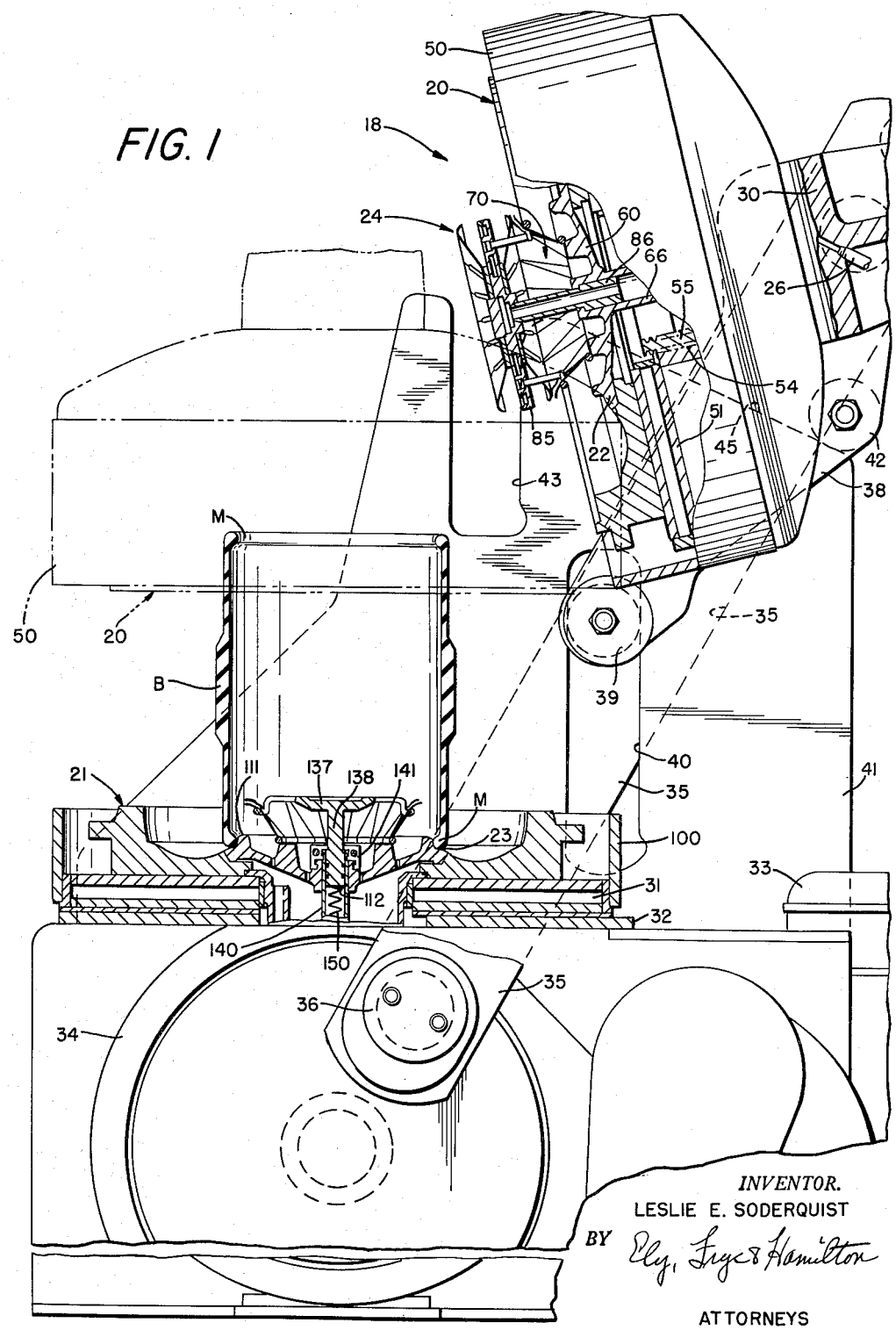

Aug. 29, 1961   L. E. SODERQUIST   2,997,740
PRESS FOR SHAPING AND CURING PNEUMATIC TIRES
Filed Jan. 7, 1959   6 Sheets-Sheet 1

INVENTOR.
LESLIE E. SODERQUIST
BY
ATTORNEYS

Aug. 29, 1961     L. E. SODERQUIST     2,997,740
PRESS FOR SHAPING AND CURING PNEUMATIC TIRES
Filed Jan. 7, 1959     6 Sheets-Sheet 2

INVENTOR.
LESLIE E. SODERQUIST
BY
ATTORNEYS

Aug. 29, 1961  L. E. SODERQUIST  2,997,740
PRESS FOR SHAPING AND CURING PNEUMATIC TIRES
Filed Jan. 7, 1959  6 Sheets-Sheet 3
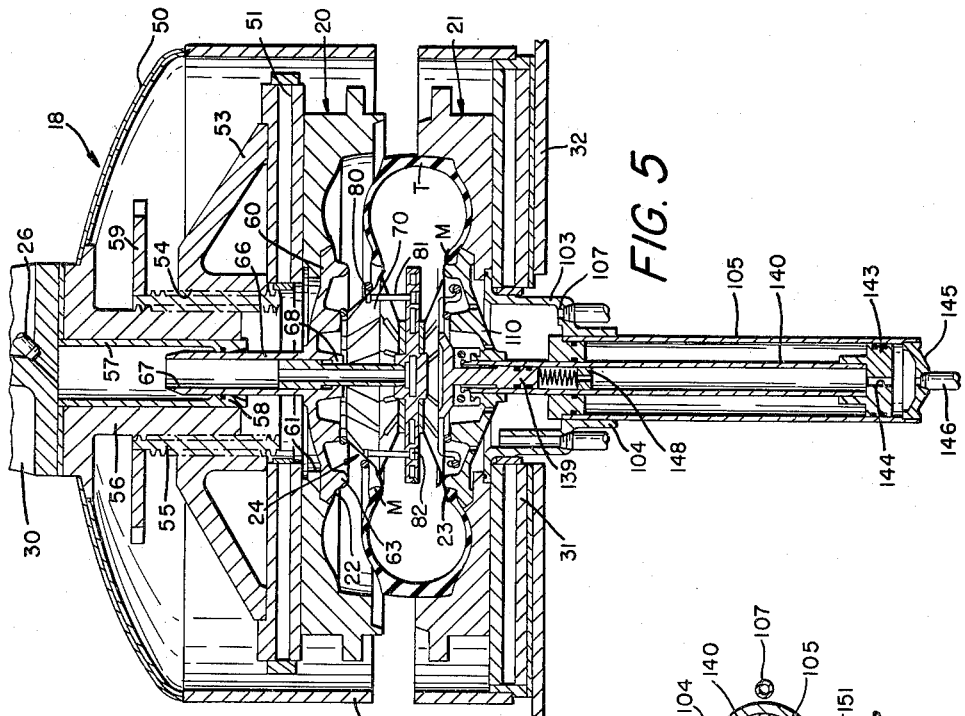
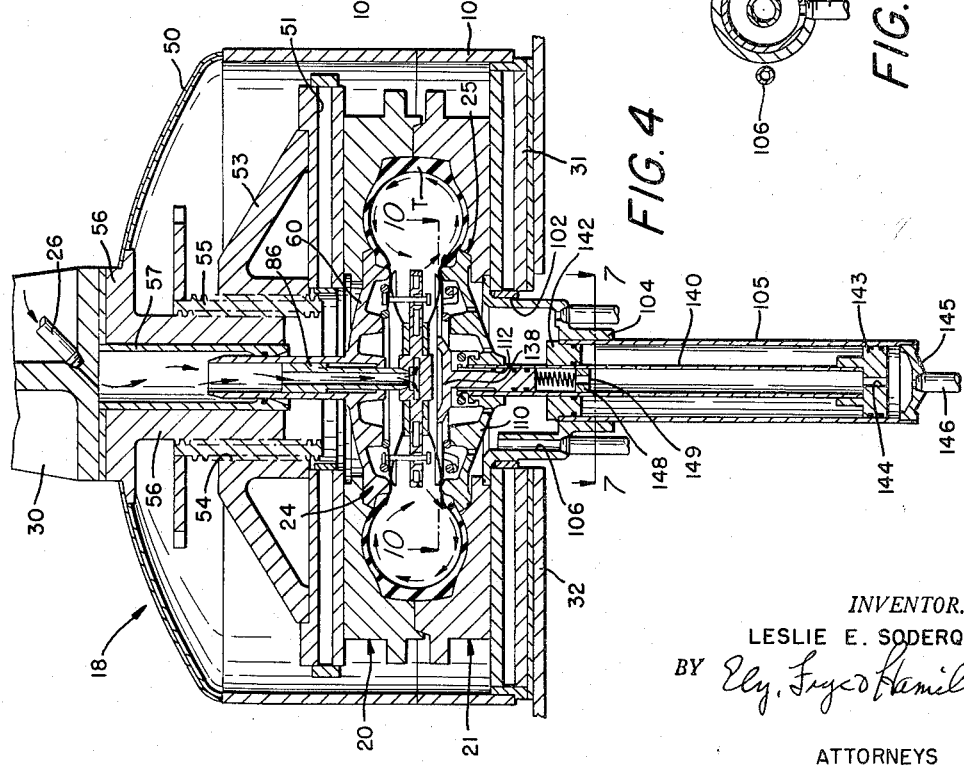
INVENTOR.
LESLIE E. SODERQUIST
BY Ely, Frye & Hamilton
ATTORNEYS Aug. 29, 1961 L. E. SODERQUIST 2,997,740
PRESS FOR SHAPING AND CURING PNEUMATIC TIRES
Filed Jan. 7, 1959 6 Sheets-Sheet 5

INVENTOR.
LESLIE E. SODERQUIST
BY
ATTORNEYS

Aug. 29, 1961 L. E. SODERQUIST 2,997,740
PRESS FOR SHAPING AND CURING PNEUMATIC TIRES
Filed Jan. 7, 1959 6 Sheets-Sheet 6
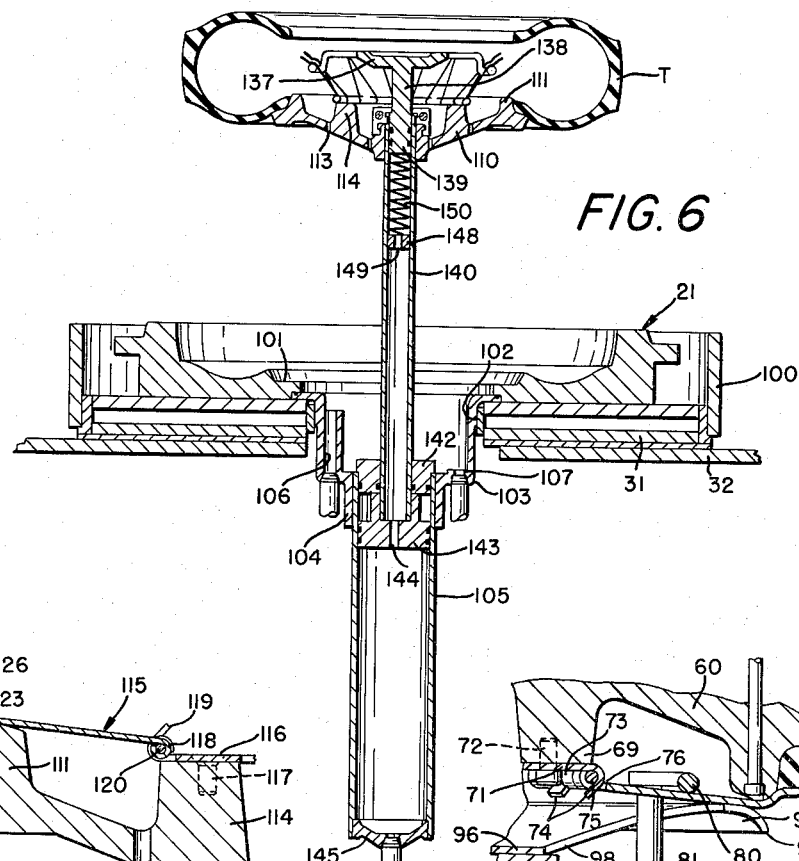
INVENTOR.
LESLIE E. SODERQUIST
BY
ATTORNEYS

United States Patent Office 2,997,740
Patented Aug. 29, 1961

2,997,740
PRESS FOR SHAPING AND CURING
PNEUMATIC TIRES
Leslie Edward Soderquist, Silver Lake, Ohio, assignor to
The McNeil Machine & Engineering Company,
Akron, Ohio, a corporation of Ohio
Filed Jan. 7, 1959, Ser. No. 785,413
6 Claims. (Cl. 18—17)

The present invention relates to a new and improved press wherein unvulcanized tire bands are shaped into tire form and cured without removal from the press. More particularly, the invention relates to a press in which pressure shaping and curing medium is in direct contact with the interior of the tire band providing for the forming, molding and curing of tires without preshaping and without an air bag or diaphragm. This type of operation is currently referred to as "bagless cure" and is particularly suited for the production of tires having a pressure fluid-impervious inner lining.

The inventor herein has made many contributions to the art of presses for shaping and curing pneumatic tires. Among others, he has been granted United States Patent No. 2,808,618, to which reference is made below for details of a representative press operating mechanism which may be used in cooperation with the invention. The inventor herein has also been granted several patents in the bagless cure art; among which are United States Patent Nos. 2,812,544 and 2,812,545.

The 2,812,544 patent relates to presses having relatively movable mold halves (1, 2) and rigid, plate-like bead clamping rings (35, 36) which are located between and overlying the beads of a shaped tire band (B). The bead clamping rings are separated by action of the pressure shaping and curing medium when the press is closed to force the beads against the mold halves for the curing period. The similar purpose presses according to the 2,812,545 patent also have rigid opposed bead clamping rings (30, 32), which are fully separated by action of pressure other than the pressure of the shaping and curing medium to seat the tire band beads against their respective mold halves for the curing period.

The general object of the present invention is to provide a center mechanism for bagless cure presses which includes individual folding bead clamping assemblies, which preferably are petal-like and carried by the relatively movable mold halves of the press. The novel bead clamping assemblies are unfolded within a green tire band to exert pressure to force or seat the tire beads against the bead seats of the mold halves for the curing period. After curing, both novel bead clamping assemblies are folded and withdrawn from within the cured tire, as the mold halves separate to open the press, and move to a position out of the path of the cured tire as it is being removed from the press; and while a green tire band is being placed in the press.

A further object of the invention is to provide petal-like bead clamping assemblies which can be made of light-weight metal stampings and yet will interact in such a manner as to provide ample mechanical pressure for forcing the green tire band beads into an annular seat for molding the tire beads.

A further object of the invention is to provide novel bead clamping assemblies which can be separately assembled, away from the press, and readily installed for production of tires of varying distances (internal diameter) across the beads.

Still another object is to provide a folding petal-like bead clamping assembly comprising a plurality of interleafing elements having resilient characteristics and a peripheral construction to adequately seat the green tire beads and yet prevent formation of objectionable irregularities or ridges around the bead inner surface during initial forming of the bead.

A further object of the invention is to provide bead clamping means which during opening of the press move inwardly and away from the formed beads preventing accidental damage or injury thereto.

Still another object is to provide novel means cooperating with the bead clamping assemblies for circulating the fluid curing medium during the cure and for draining condensate from the tire after cure and before removal from the press.

These and other objects of the invention, as well as the advantages thereof, will be apparent in view of the following description taken in conjunction with the accompanying drawings.

Figures 2, 3:
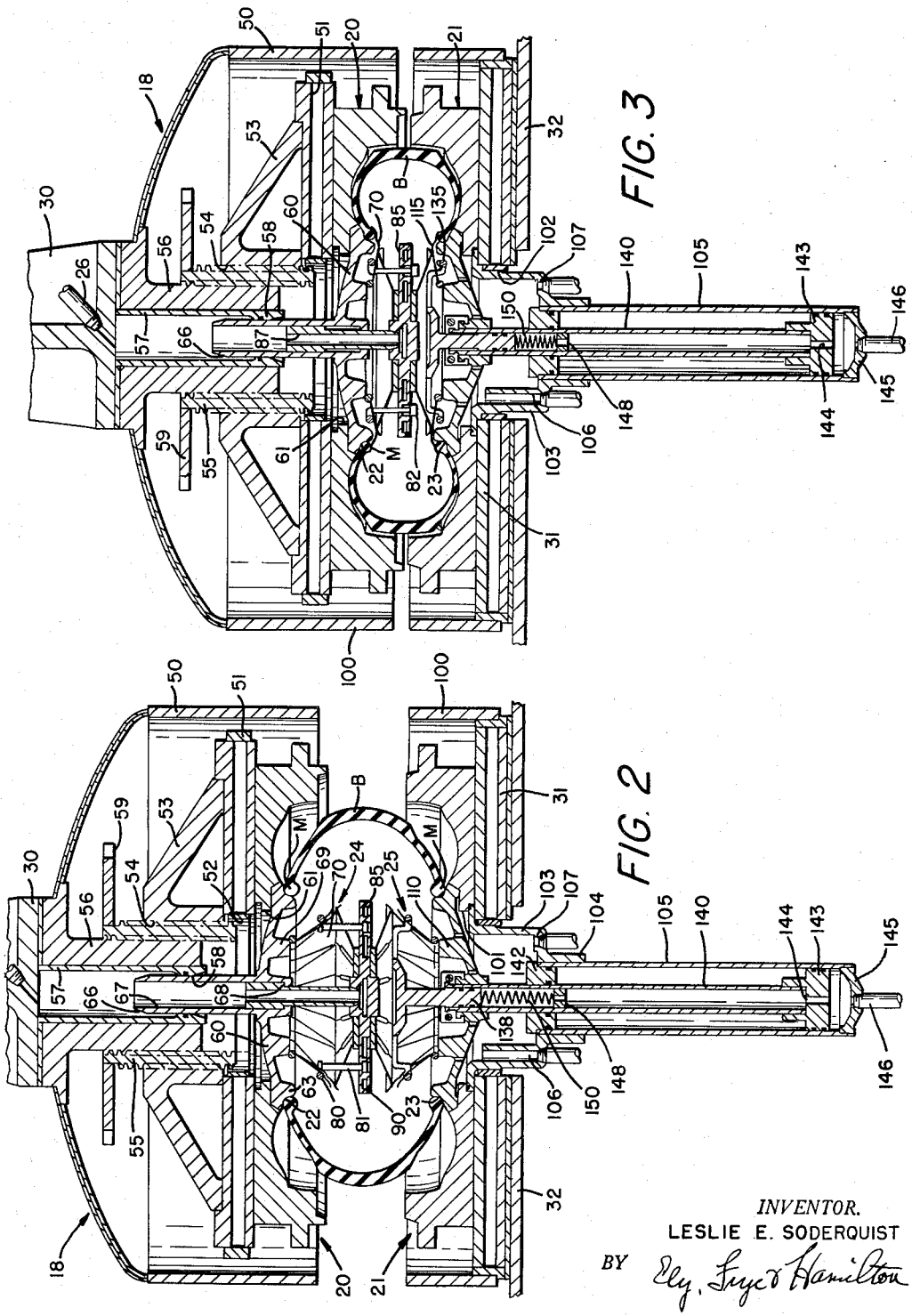
Figure 8:
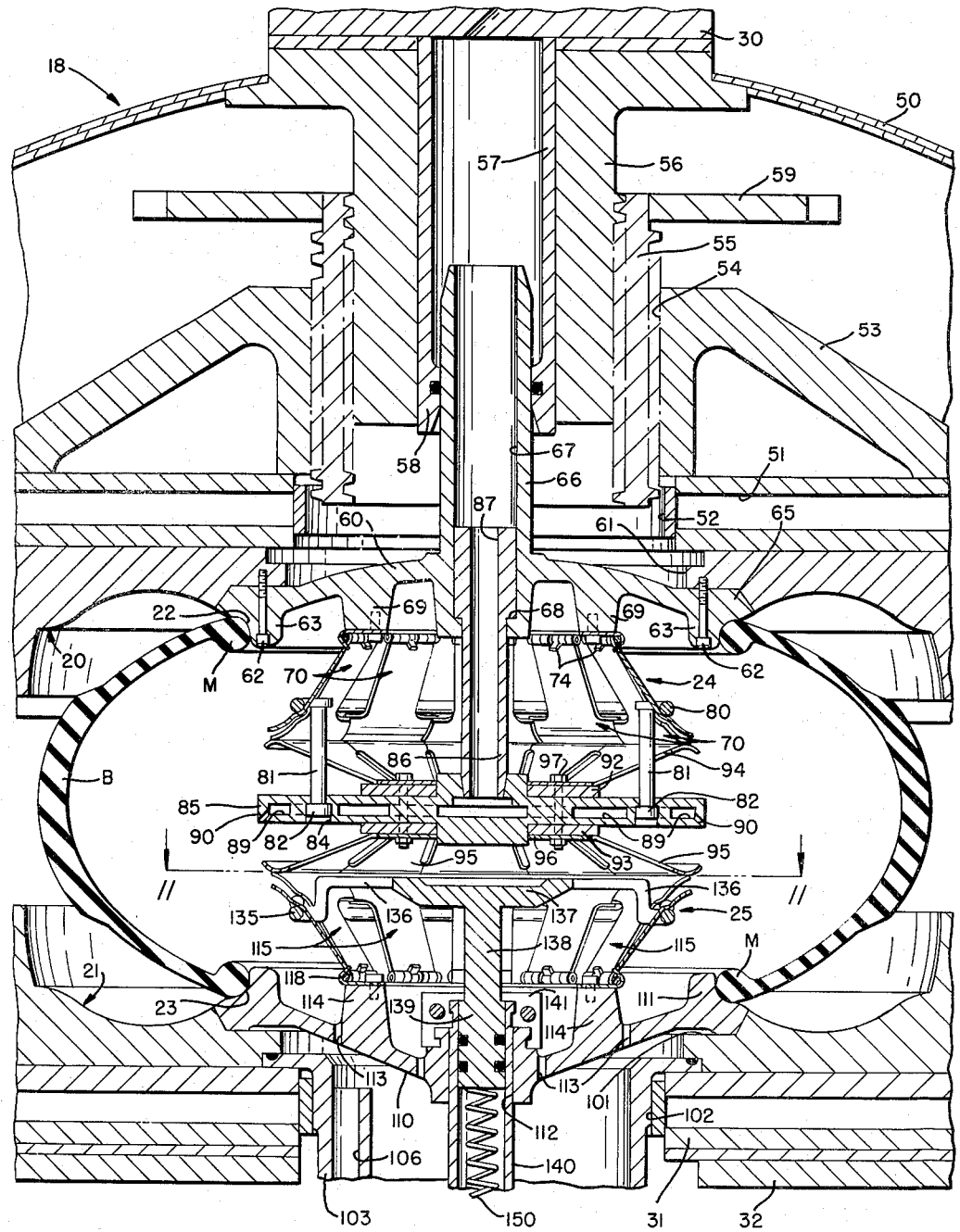
Figure 10:
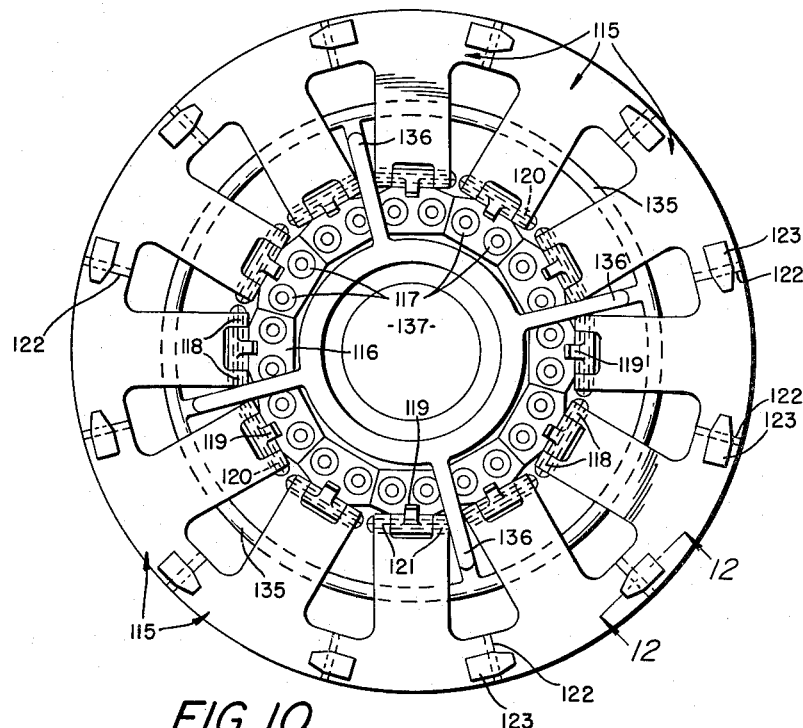
Figure 12:
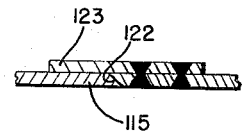
Figure 11:
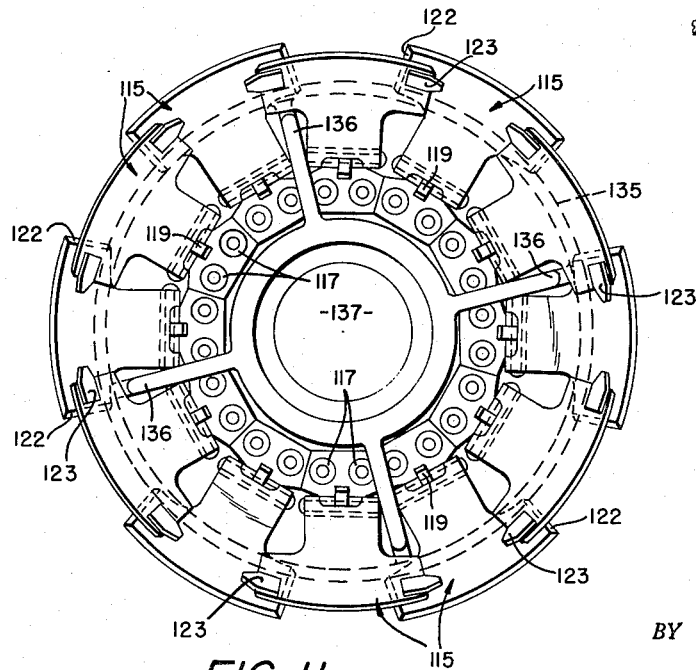

In the drawings:
FIG. 1 is an elevation, partly in section, of a press in open position with a green tire band in position on the lower mold half;
FIG. 2 is a sectional view showing the approach of the mold halves with a partially shaped tire band and the bead clamping assemblies just making contact with each other but still in the folded or inactive position;
FIG. 3 is a similar view but with the mold halves almost closed and with the petals of the bead clamping assemblies engaging the green tire beads and almost fully unfolded;
FIG. 4 is a similar view of the mold halves fully closed with the bead clamping assemblies completely unfolded and showing the improved action of the curing fluid circulation and drainage means;
FIG. 5 is a similar view showing the mold halves beginning to separate as the press opens after curing a tire;
FIG. 6 is a similar view showing the press as fully open with cured tire stripped from the lower mold half;
FIG. 7 is a detail taken substantially as indicated on line 7—7 of FIG. 4;
FIG. 8 is an enlarged elevation showing the upper and lower bead clamping assemblies in the position of FIG. 2;
FIG. 9 is a further enlarged fragmentary elevation showing the bead clamping assemblies in the position of FIG. 4;
FIG. 10 is a plan view of the lower or bottom bead clamping assembly in the completely unfolded position of FIGS. 4 and 9;
FIG. 11 is a view similar to FIG. 10 but with the lower bead clamping assembly in the folded position of FIGS. 2 and 8;
FIG. 12 is an enlarged detail taken substantially on line 12—12 of FIG. 10 showing the interaction of adjacent bead clamping petals;
FIG. 13 is an approximate full scale elevation showing in detail a petal of a lower bead clamping assembly having a detachable resilient rubber pad in contact with the inner surface of the lower bead portion of a tire band.
FIG. 14 is a similar view showing an adhesively secured rubber pad; and
FIG. 15 is another similar view showing a form of resilient metallic cushion in contact with the bead inner surface.

Referring to the drawings, the press for shaping and curing pneumatic tires is indicated generally at 18. The press 18 has an operating mechanism, as shown and described in the aforesaid 2,808,618 patent. This mechanism is optional only as other forms of press-operating mechanism may be used so long as the movable mold half is moved in a straight line during the final shaping operation. The movable mold half, which may be the upper or lower mold section, can be moved in a straight line during the entire opening and closing operation, or only during the latter part of the closing movement and the commencement of the opening movement, i.e., during the period that the mold sections are in contact with both beads of the tire.

Referring to FIG. 1, the press 18 as shown is one in which the upper mold half 20 is movable while the lower mold half 21 is stationary. When the press is open, the upper mold moves to the full line position to allow either manual or automatic removal of a cured tire (T) and placement of a green tire band B on the lower mold.

As shown in FIG. 2, on the closing movement of the press 18, the upper mold 20 is first rocked into the dotted line position of FIG. 1, parallel to but spaced above and aligned with the lower mold 21, and is then moved downwardly in a straight line to complete the closing movement. This allows the annular bead seat 22 of the upper mold 20 to contact the upper beaded edge M of the band B and exert the required pressure on the band, which, with the admission of pressure to the interior of the band, will bring it to tire form concurrently with the closing of the press, the lower beaded edge M of the band B being in bead seat 23 of the lower mold 21.

As shown in FIG. 4, when the press 18 is closed, the bead clamping assembly 24 carried axially of the upper mold 20 and the bead clamping assembly 25 mounted axially of the lower mold 21 will each have unfolded to seat the tire band beads M in their respective bead seats. This seals the edges of the band and the full shaping and curing pressure is then admitted to the interior of the mold. If desired during the cure period, fluid, such as steam or hot water, may be introduced from inlet pipe 26 to the interior of the mold for circulating the fluid curing medium as indicated by the arrows.

At the end of the cure period, all fluid pressure in the mold is relieved. The press is opened by lifting the upper mold (FIG. 5) and the lower bead clamping assembly is elevated stripping the cured tire from the lower mold half (FIG. 6). The entire cycle is controlled by suitable automatic controls and timing devices (not shown) so that all the operator is required to do is to place the green tire band on the lower bead seat 23 and press a button.

The upper mold 20 is supported from a crosshead member 30. The lower mold 21 is mounted on a steam heated platen 31 carried on the bed 32 of the press. At the rear of the press is a motor 33 which through suitable intermediate gearing (not shown) rotates large bull gears 34 at either side of the press. Long vertical links 35 extend between bearing pins 36 on the bull gears and suitable trunnions (not shown) at either end of the crosshead 30.

The movement of the upper mold 20 during the opening and closing of the press is controlled by a guide arm 38 on each side of the press carrying a lower roller 39 which moves in a vertical guideway 40 formed in a plate 41 mounted on the bed of the press. Each guide arm 38 also carries a second roller 42 which, during the latter part of the closing movement and the forepart of the opening movement moves in a second guideway slot 43 in plate 41. The upper end of each guideway 43 is open, and extending rearwardly therefrom is a downwardly inclined extension 45 or trackway for each roller 42.

The above description is considered sufficient for a full understanding of the press operating mechanism. Extended reference may be made to the aforesaid 2,808,618 patent for a more complete description.

THE UPPER MOLD AND BEAD CLAMPING ASSEMBLY

Referring to FIGS. 2 and 8, the upper mold half 20 is housed within an outer casing 50 and is attached to a steam platen 51 having a central bore opening 52. The platen 51 is attached to the underside of a mold support 53 having a threaded central bore opening 54. A sleeve member 55 having inner and outer threads is inserted in the opening 54 engaging the threads thereof.

The inner threads of the sleeve 55 are in turn engaged with the outer threads of crosshead coupling member 56 attached to the crosshead 30. The coupling member 56 also has a central bore opening press fitted with a sleeve bushing 57 and preferably in communication with the air inlet pipe 26. The sleeve bushing 57 has a reduced diameter lower neck 58 fitted with a suitable pressure seal. The connection between the coupling 56, sleeve 55 and support 53 is adjustable for different size mold halves by the gear wheel 59.

The upper bead clamping assembly 24 includes a bead ring member 60 which in cross-section is substantially in the form of an inverted T. The bead ring member 60 nests within a central bore opening 61 in the upper mold half 20 and is secured thereto by a series of bolts 62 extending through a circular flange 63. The outer surface of flange 63 is extended to provide the preferably tapered upper bead seat 22, described above.

The hub portion of bead ring 60 has a sleeve extension 66 defining a central bore opening 67 having a reduced diameter shoulder 68 at the lower end. The upper end of sleeve 66 extends into the reduced diameter end 58 of the coupling bushing 57. Between the hub portion and the circular flange 65 of the bead ring is a circular boss 69 which is provided for attachment of the individual upper bead clamping petal element 70.

The bead petal elements 70 of the upper clamping assembly 24 are preferably twelve in number and, as best shown in FIG. 9, have base plates 71 which are attached to the circular boss 69 by countersunk screws 72. Each petal base plate 71 extends substantially the width of the mounting surface of boss 69 and each terminates at the other edge in hinge loops 73 and a hinge stop 74. The hinge loops 73 carry a hinge pin 75 which engages interfitting hinge loops 76 on the inner end of the resilient portion of each petal element 70.

The upper bead clamping assembly 24 further includes a free hanging ring 80 having a diameter larger than the diameter of circular boss 69 but smaller than the diameter of the upper bead seat 22. The ring 80 will thus be supported on the upper surface of the resilient portion of each of the petal elements 70. The angle of each pedal hinge stop 74 is fixed so that in the inactive position (FIG. 8) the petal elements 70 are folded by the weight of ring 80 to a diameter smaller than the diameter of the tire band beads M.

The ring 80 carries a series of depending studs 81. The studs 81 which are attached as by welding to the ring 80, are preferably four in number, and may be machine bolts having a depending head portion 82. The head portion 82 of each stud is received in a conforming recessed bore 84 in a circular actuation plate 85. The hub portion of plate 85 is bored for attachment to the lower end of a coupling sleeve 86. The coupling sleeve 86 extends into the bead ring sleeve 66 and is movable therein having an enlarged diameter upper end 87, which stops against shoulder 68.

Extending radially from the hub portion of plate 85 are a series of interior passages 89 terminating in downwardly, outwardly and tangentially inclined exit passages 90. When it is desired to admit fluid into the interior of the mold, for the purpose of curing medium circulation, or for drainage of condensed curing fluid, fluid admitted under pressure through inlet 26 will pass through the bushing 57, the bore of sleeve 66, the bore of sleeve 86, the hub portion of plate 85 and the passages 89 and 90, into the mold interior.

Attached to either side of the actuation plate 85, surrounding the hub portion thereof, are similar circular plates 92 and 93. The plates 92 and 93 are spacers which provide means for varying the load applied by the upper and lower actuating petal elements, 94 and 95 respectively. The elements 94 and 95, each preferably twelve in number and located concentrically of the petal elements 70, are of one-piece construction having an annular flat portion 96 for attachment as by through bolts 97 on opposite sides of plate 85. Outwardly of the flat portion 96, each element 94 and 95, has a resilient radially diverging portion 98 terminating in a broad curved lip portion 99.

THE LOWER MOLD AND BEAD CLAMPING ASSEMBLY

The lower mold half 21, mounted on the platen 31 as described above, is housed within an outer casing 100. The mold half 21 has a stepped central bore opening 101 aligned with a central bore opening 102 in platen 31. Fitted within the opening 102 and beneath the mold half 21 is a bell-shaped housing 103. The housing 103 has a depending central opening defined by a flange 104 receiving the outer casing of a cylinder 105. The housing 103 is also provided with an inlet passage 106, for admission of pressure shaping and curing medium into the interior of the press, and an outlet passage 107 for drainage of condensate after the curing period.

The lower bead clamping assembly 25 includes a bead ring member 110. The bead ring member 110 nests within the central bore opening 101 in the lower mold half 21 but is movable in relation thereto, as described below. The bead ring member 110 has a circular flange 111 the outer surface of which is extended to provide the preferably tapered lower bead seat 23, described above. The hub portion of bead ring 110 has a central bore opening 112. Between the hub portion and the circular flange 111 of the bead ring are a series of fluid passages 113 and a circular boss 114 which is provided for attachment of the individual lower bead clamping petal elements 115.

The bead petal elements 115 of the lower clamping assembly 25 are preferably twelve in number and have base plates 116 which are attached to the circular boss 114 by countersunk screws 117. Each petal base plate 116 extend substantially the width of the mounting surface of boss 114 and each terminates at the outer edge in hinge loops 118 and a hinge stop 119. The hinge loops 118 carry a hinge pin 120 which engages interfitting hinge loops 121 on the lower end of the resilient portion of each petal element 115.

The elements 115, and the elements 70 of the upper bead clamping assembly 24, similar details of which are not shown, are substantially T-shaped when viewed in plan. The radial edges of alternate elements 115 are beveled as indicated at 122 in FIG. 12 to provide a substantially full circumferential contact with the inner surface of a bead M when the tire band B is being shaped and the press 18 is closed and the petal elements are in the unfolded position of FIGS. 4 and 10. The bevel edge elements 115 are also provided at each radial edge with stop plates 123 to assure the smoothness of the circular surface provided in the unfolded position.

Referring to FIG. 13, the peripheral portion of each element 115 may be provided with an arcuately sectional and detachable resilient rubber pad 125 having a lower surface conforming to the desired contour of the inner surface of bead M. A thin arcuately sectional shim 126 may be placed on the upper surface of each bead pad 125 which is secured to its element 115 by suitable bolts and nuts 127.

Referring to FIG. 14, an alternative form of arcuately sectional and resilient rubber pad 128 could be secured as by a suitable adhesive, resistant to the curing medium at elevated curing temperatures, to the elements 115.

Referring to FIG. 15, a further alternative form of a bead clamping petal element 115, particularly suited for use when shaping tires have relatively thick beads such as metal reinforced or truck tires, could employ an arcuately sectional and resilient metallic cushion element 130 brased to the element 115 and adapted for contact with the bead inner surface. Each cushion element 130 extends from over the bead seat area 23 radially inwardly at least part way over the circular flange 111. The cushions 130 may be multiple and installed as leaf springs to vary stiffness of the tip of the petal elements.

The lower bead clamping assembly 25 further includes a spider member supporting a peripheral ring 135 having a diameter larger than the diameter of the circular boss 114 but smaller than the diameter of the lower bead seat 23. The ring 135 contacts and bears against the under surface of the resilient portion of each of the petal elements 115. The angle of each petal hinge stop 119 is so fixed that when the ring 135 is elevated (FIG. 8) the petal elements 115 are folded to a diameter smaller than the diameter of the tire band beads M.

The ring 135 is supported by a series of small diameter preferably offset arms 136. The arms 136, preferably four in number, extend radially of a spider hub plate 137. Depending axially of the hub plate is a spider stem 138 having an enlarged diameter lower end 139. The lower end of the spider is movably received in the upper end of a sleeve piston rod 140. The sleeve piston rod is mounted axially of the cylinder 105 and is fitted into the bore opening 112 of the hub portion of bead ring 110. A split keeper collar 141 clamps the upper end of the piston rod 140 and the hub portion of the bead ring 110 and provides a stop shoulder for the lower end 139 of the spider stem.

Below the bead ring, the piston rod 140 extends axially through a cylinder upper end wall 142, seated within the casing of cylinder 105 and the flange 104 of the bell-shaped housing. The lower end of piston rod 140 is press fitted in a cylinder piston member 143. The cylinder piston has a small diameter axial bore 144 communicating with the hollow interior of piston rod 140 and normally bottoms adjacent a lower end cap 145. The cylinder end cap has an inlet 146 for admission and exhaust, as described below, of a suitable cylinder actuating fluid.

Within the sleeve piston rod 140 is fitted a stud plug 148 preferably having a small diameter axial bore 149. A coiled compression spring 150 is seated atop the plug 148 and bears against lower end 139 of the spider stem which normally seats against the keeper collar 141.

OPERATION

Figure 1

At the beginning of a curing cycle, the press is open with the upper mold half 20 being in a tilt-back position. A green tire band B is placed on the lower mold half 21 with the lower beaded edge M located in bead seat 23 and the lower bead clamping assembly 25 within the band B.

Figure 2

The press is then operated to move the mold halves together. The upper bead clamping assembly 24 passes through the upper beaded edge M which locates in bead seat 22. When the mold halves have closed sufficiently to seat the beaded edges M in bead seats 22 and 23, it is preferred that a fluid medium under low pressure be admitted through inlet 106 and passages 113 in the lower bead ring 110 into the interior of the band B. Thus, the band can be shaped to tire form concurrently with the closing of the press.

Figure 3

During the initial closing movement, the upper bead clamping assembly 24 is folded to a diameter smaller than the diameter of the upper beaded edge M by the weight of free hanging ring 80. The lower bead clamping assembly 25 is similarly folded by the force exerted by spring 150 against the spider ring 135. When the mold halves are almost fully closed, the concentrically located actuative petal elements 94 and 95 carried by the actuation plate 85 will contact and unfold the upper and lower bead clamping petal elements 70 and 115, overcoming and compressing the coiled spring 150 biasing the spider ring 135.

Figure 4

When the press is fully closed, the actuating petal elements 94 and 95 will fully unfold the clamping petal elements 70 and 115 (as shown in FIG. 9), to exert full forming or molding pressure against the inner surface of the beaded edges M. It will be noted that while the mold halves are moving from the FIG. 2 to the FIG. 4 positions, the petal elements 70 and 115 preferably do not fully engage the beads M until the band is fully or substantially fully shaped. The purpose of this is to allow the beads to roll upon themselves without restriction during transition from band form to tire shape. This is important because the shifting of the tire fabric about the bead cores must be allowed for; otherwise, the tire will not properly form.

During the cure, the fluid curing medium under high pressure is admitted through inlet 106 and the passages 113 in the lower bead ring into the interior of shaped tire T. If desired, during the curing period, high pressure fluid other than the curing medium may be introduced through inlet 26, as described above, to circulate the curing medium to ensure uniformity of cure at a higher rate than would conventionally be expected.

Figure 5

When the cure is completed the high pressure curing medium is cut off and the upper mold half 21 begins to lift. As the upper clamping assembly 24 also lifts, the upper clamping petals 70 begin to fold by the action of the tire bead M stripping from the mold, the ring 80 maintaining the petals 70 in the folded position.

Before the opening period, high pressure air may be introduced through inlet 26, as described above, for removal of condensed curing fluid which collects in the tire during the cure. The air from inlet 26 passes out into the interior of the cured tire through the passages 90 and the condensate is blown onto the bead ring 110 where it collects and passes through the passages 113 into the housing 103 and out the drain passage 107.

Figure 6

After the press is open with the upper mold half 20 being in a tilt-back position, the cured tire T is stripped from the lower mold half 21 and elevated for ready removal. Throughout the preceding periods of the curing cycle as described above, the cylinder 105 has been in an inactive condition. However, to strip to the tire T, fluid pressure is admitted through inlet 146. The fluid pressure acts principally against piston 143 which raises until it stops against the upper end wall 142. This movement elevates the piston rod 140 and the lower bead ring 110 above the lower mold half 21. To assist the spring 150 in raising the spider ring 135 to fold the clamping petals 115, the fluid pressure is also admitted through inlet 146 and passes through bore 144 in the piston member and bore 149 in the stud plug within piston rod 140. This pressure acts against the lower end of the spider stem 138 and assists the spring 150 to extend.

At the end of the press operating cycle, the flow of pressure fluid through inlet 146 is exhausted to drain and fluid pressure admitted through the inlet pipe 151 (FIG. 7) returns the lower bead clamping assembly 25 and the bead ring 110 to the position of FIG. 1.

The above description and accompanying drawings are considered sufficient to enable one skilled in this art to understand the principles and workings of the press 18 according to the invention. However, it will be appreciated that the details are not essential and may be varied or modified within the scope of the advance in the art and the appended claims. Further, while the invention has been shown and described in connection with one pair of mold halves, the principles thereof could be used in dual presses. Also, no showing has been made of any wiring diagram and switches by which closing of the mold halves, admission of the shaping and curing media, circulation of air within the cured tire, elevation of the lower bead clamping member, etc., are automatically controlled, since such details may be readily designed by any qualified electrical engineer when the sequence of operations as described herein is understood.

What is claimed is:

1. A center mechanism for bagless cure tire presses having relatively movable mold halves, comprising an individual folding petal-like bead clamping assembly carried by each of said mold halves and means carried by said mold halves and located concentrically of the petal assemblies for unfolding said assemblies during closing of the press, each of said assemblies including a plurality of interleafing elements having resilient characteristics and a yielding peripheral construction providing substantially full circumferential contact with the inner surface of a tire bead during said unfolding of the petal assemblies.

2. In a press for shaping and curing tire bands with the shaping and curing medium in contact with the interior of the tire, said press having relatively movable mold halves with bead seats, individual bead clamping means mounted axially of each mold half, each of said means exerting pressure to force the bead of a tire band against the bead seat of the mold half on which said means is mounted, comprising, a circular boss located axially and inwardly of a bead seat, a series of petal elements hingedly mounted on said boss and means to unfold said petal elements for substantially full circumferential contact with the inner surface of the bead during closing of the press.

3. In a press for shaping and curing tire bands while the pressure curing medium is in direct contact with the interior of the tire, said press having relatively movable upper and lower mold halves, each mold half having a bead seat, individual bead clamping means mounted axially of each mold half to force the bead of a tire band against the bead seat of the mold half on which said means is mounted, comprising, a circular boss located axially and inwardly of a bead seat, a series of petal elements hingedly mounted on said boss and means to unfold said petal elements when said bead seats are in contact with a tire band during closing of the press.

4. A bead clamping assembly for use in combination with the upper mold half of a bagless cure press, comprising, a circular boss member located axially of said mold half and having a diameter smaller than the bead diameter, an actuation plate depending axially of said circular boss member and movable relative thereto, a series of resilient petal members dependingly mounted from said circular boss member, means surrounding said petal members and connected to said plate for folding said petal members to a diameter smaller than said bead diameter, and additional means on said plate for unfolding said petal members when the press is closed.

5. A bagless cure tire press comprising, an upper mold half having a fixed bead seat and a lower mold half having a movable bead seat, an upper petal-like bead clamping assembly attached to the upper bead seat, hollow means extending coaxially and below said upper assembly, an actuation plate attached to the lower end of said hollow means and having radially extending passages providing conduits between said sleeve and the interior of a tire being cured, a lower petal-like bead clamping assembly attached to the lower bead seat, petal actuating elements on said actuating plate for unfolding said clamping assemblies by contact therewith to force the tire beads against said bead seats during the curing period, and means communicating with said support sleeve for introducing a pressure fluid other than the curing medium into the interior of a tire being cured.

6. A bagless cure press comprising, a support, an upper mold half attached to the support, an upper bead ring attached to the mold half, a plurality of downwardly directed petal bead clamping elements attached to said bead ring, circular means for folding said elements to a diameter smaller than the bead diameter of a tire being cured, a movable hollow sleeve supported by and extending below said upper bead ring, an actuation plate attached to said hollow sleeve and said circular means, said plate having passages therethrough providing conduits between said sleeve and the interior of a tire being cured, a press bed, a lower mold half attached to the support, a lower bead ring on said lower mold half, cylinder means to raise said lower bead ring above said press bed, a plurality of upwardly directed petal bead clamping elements attached to said lower bead ring, a movable spider supported by and extending above said lower bead ring, circular means supported by said spider for folding said lower petal elements to a diameter smaller than the bead diameter of a tire being cured, additional elements carried by said actuation plate for unfolding said upper and lower bead clamping elements when said press is closed, and additional conduit means communicating with said hollow sleeve for introducing a pressure fluid other than the curing medium into the interior of the tire.

References Cited in the file of this patent

UNITED STATES PATENTS

| | | |
|---|---|---|
| 2,571,258 | Kolins | Oct. 16, 1951 |
| 2,812,544 | Soderquist | Nov. 12, 1957 |
| 2,812,546 | Soderquist | Nov. 12, 1957 |

FOREIGN PATENTS

| | | |
|---|---|---|
| 206,450 | Australia | Aug. 23, 1956 |
| 209,000 | Australia | June 28, 1956 |
| 214,949 | Australia | May 23, 1957 |